(12) United States Patent
Opfer et al.

(10) Patent No.: US 6,869,341 B2
(45) Date of Patent: Mar. 22, 2005

(54) SINGLE-SIDED FINISHING APPARATUS

(75) Inventors: Mark Opfer, Pemberville, OH (US);
Brad Borkosky, Perrysburg, OH (US);
John Harkness, Bowling Green, OH (US)

(73) Assignee: Glassline Corporation, Perrysburg, OH (US)

( * ) Notice: Subject to any disclaimer, the term of this patent is extended or adjusted under 35 U.S.C. 154(b) by 416 days.

(21) Appl. No.: 10/175,358

(22) Filed: Jun. 19, 2002

(65) Prior Publication Data

US 2003/0236060 A1 Dec. 25, 2003

(51) Int. Cl.[7] .............................................. B24B 1/00
(52) U.S. Cl. ............................ 451/65; 451/28; 451/41; 451/44; 451/296; 451/299; 451/301; 451/303; 451/306; 451/311
(58) Field of Search ............................ 451/28, 41, 44, 451/65, 296, 299, 301, 303, 306, 311

(56) References Cited

U.S. PATENT DOCUMENTS

| | | | |
|---|---|---|---|
| 3,800,477 A | | 4/1974 | Jendrisak et al. |
| 4,685,180 A | * | 8/1987 | Kitaya et al. ................ 29/33 R |
| 6,306,015 B1 | | 10/2001 | Bushell |
| 6,604,984 B2 | * | 8/2003 | Gariglio ........................ 451/5 |

* cited by examiner

Primary Examiner—Joseph J. Hail, III
Assistant Examiner—Shantese McDonald
(74) Attorney, Agent, or Firm—Emch, Schaffer, Schaub & Porcello Co., L.P.A.

(57) ABSTRACT

A single-sided finishing apparatus is provided having a plurality of finishing stations with rotating transfer stations positioned therebetween. A hold down system presents the edge of the workpiece to the finishing head. The rotating transfer station includes a clamp for grasping a leading corner of a workpiece while rollers continue to drive the workpiece forward, thereby rotating the workpiece 90°.

12 Claims, 10 Drawing Sheets

SINGLE-SIDED FINISHING APPARATUS

FIELD OF INVENTION

The present invention relates to a grinding system designed to finish all edges of a glass workpiece, and more particularly, to an apparatus wherein glass workpieces of varying sizes are finished without need for apparatus shutdown or changeover.

BACKGROUND OF THE INVENTION

The apparatus of this invention is designed to finish the raw edges of a cut glass workpiece prior to tempering or toughening the workpiece. Also, the finishing of such raw edges eliminates sharp edges, glass chips, and spall which have a tendency to injure operating personnel and others handling the cut glass workpieces.

Common finishing operations generally employ a double-sided operation wherein a pair of opposed grinding wheels or belts are positioned such that a glass workpiece traveling between the grinders or belts is finished on opposing edges. For instance, in U.S. Pat. No. 3,800,477, the glass sheet passes through a pair of endless flexible abrasive belts which seam opposing edges. Upon completion of the finishing operation, the workpiece is rotated 90° on the conveyer by means of a rotating arm unit which grasps the workpiece and rotates with the workpiece to an orientation 90° removed from the original orientation of the workpiece. The glass workpiece is then seamed on its opposing edges. Such double edge finishing systems with rotating arms are at a disadvantage when a variety of workpieces of differing shapes and sizes are processed. The machine must be retooled to accommodate the variety of sizes, thereby creating costly down time in production.

Other common prior art edge finishing techniques include the use of a double edge grinding machine, wherein the glass plates or workpieces are passed along a horizontal conveyer with parallel banks of grinding wheels on each side of the glass plates. Yet another prior art finishing device is shown in U.S. Pat. No. 6,306,015 which teaches the use of one grinding wheel to simultaneously grind opposed edges of two different rigid planar workpieces. The method involves the use of conveyers to move and position the workpieces proximate the grinding heads and reorient the workpieces through the use of conveyers operating at a 90° orientation with respect to each other, thereby allowing the grinding wheel to machine all four sides of the rectangular workpiece.

It is an object of the invention to provide an edge finishing apparatus designed to finish the edges of a workpiece that allows for varying sizes of workpieces to be processed in-line without need for an apparatus changeover to accommodate each workpiece size and shape.

The advantages afforded by the single-sided finishing system of the present invention are numerous. Quantitatively small orders can be produced with production requirements being downloaded from a business system or order system to the glass cutting machines which can produce the glass of differing sizes to be put directly into the finishing system for processing. Thus, less inventory is needed for pre-manufacture. Since the raw glass can be cut to size as needed, the finished stock that might normally be required as inventory is now not necessary. Because there is less inventory required, there is less racking, thereby freeing up valuable production floor space. The finishing system of the present invention is designed to be placed in line with one or more cutting machines which are designed to cut differing custom sizes. The single-sided finishing system of this invention preferably uses diamond grinding wheels for producing a seamed edge or a ground edge or a pencil edge, thereby providing a more varied mix of product with higher manufacturing yields.

SUMMARY OF THE INVENTION

The singe-sided finishing apparatus of this invention preferably includes four finishing units, each having at least one grinding head and conveyer with a hold down system. The conveyer may have a lead-in guide. In the typical finishing apparatus of this invention, three transfer stations are provided, one located between each of the four finishing units.

Sensors located on a feed conveyer will reference and size an incoming part to assist in providing efficient spacing between parts as they travel through the apparatus. As each workpiece passes through each finishing unit, a hold down belt system operates in cooperation with the conveyer belts to properly align the workpieces edge with the grinding head. The hold down system is designed to stabilize the edge of the workpiece receiving the finishing operation.

While each finishing station requires only one grinding head, additional heads can be mounted for facilitating changeovers in workpiece thickness for providing sequential grinding to increase speeds when higher glass removal rates are required, and to accommodate different edge finishes such as seamed, ground, or pencil edges. The invention can be best understood upon review of the following description of the preferred embodiment with reference to the accompanying drawings.

DETAILED DESCRIPTION OF THE PREFERRED EMBODIMENT

Figure 1:
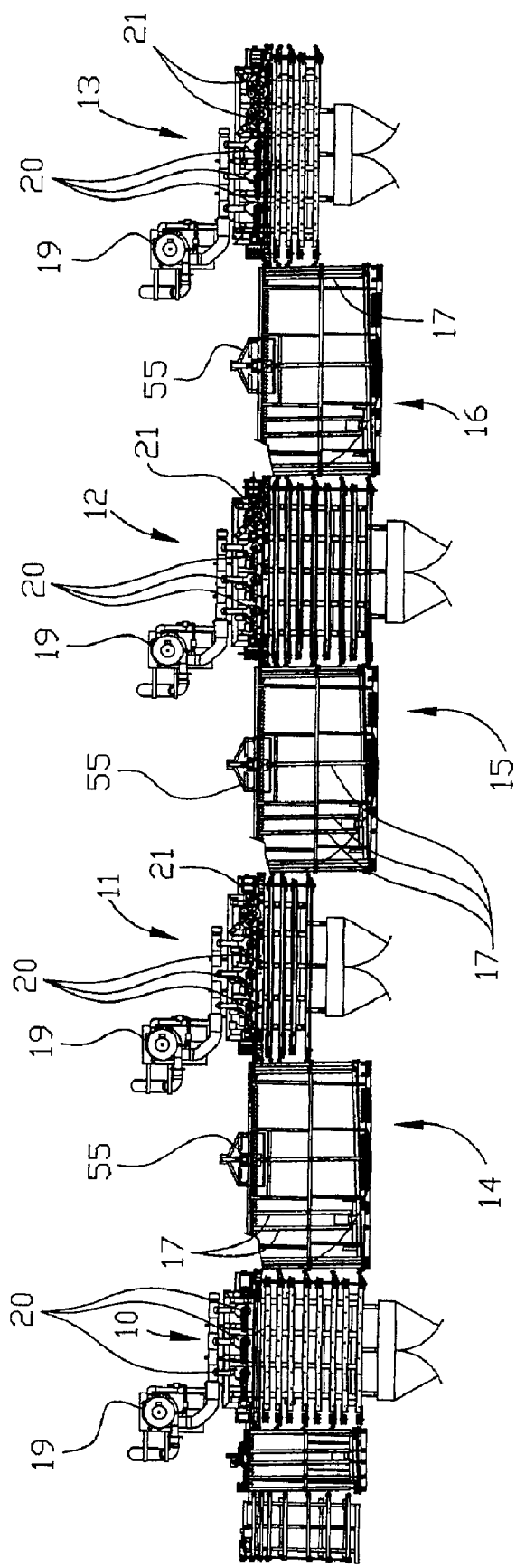
FIG. 1 is a top plan view of the single-sided finishing apparatus of this invention.

The single-sided finishing apparatus of this invention is shown in FIG. 1 as, preferably, having four finishing units 10, 11, 12, 13, linearly arranged as in a conveyer line. Ideally, three 90° transfer units 14, 15, 16 are provided, one disposed between each of the finishing units. The transfer units may be of any of the known types of 90° transfer units but, preferably, the transfer system of the invention will include a conveyer constructed of a plurality of relatively friction-free brush rollers 17 and a pneumatic ram 55 designed to retain a corner of the workpiece in one place as the workpiece is rotated 90°. A coolant feed system (not shown) is provided for each finishing unit and is designed to deliver the proper amount of coolant at the proper angle to the grinding head. Vacuum coolant collection 19 is provided to allow for cleaner operation and less coolant carryover downstream.

Still referring to FIG. 1, the finishing units preferably include a plurality of grinding heads 20. While only one grinding head 20 is required for finishing, additional heads are preferably supplied to provide variably sized grinding wheels to accommodate variations in workpiece thickness and edging variations. For instance, referring to FIG. 1, each finishing unit includes three grinding heads 20. Finishing unit 2 and finishing unit 3 also include a grinding head positioned at an angle to the conveyer which is commonly referred to as a dubbing head 21. The dubbing head 21 is used to smooth the corner between two seamed edges. Finishing unit 4 has two dubbing heads 21 intended to finish each corner of the final edge being seamed, thereby completing the finishing operation.

Figure 2:
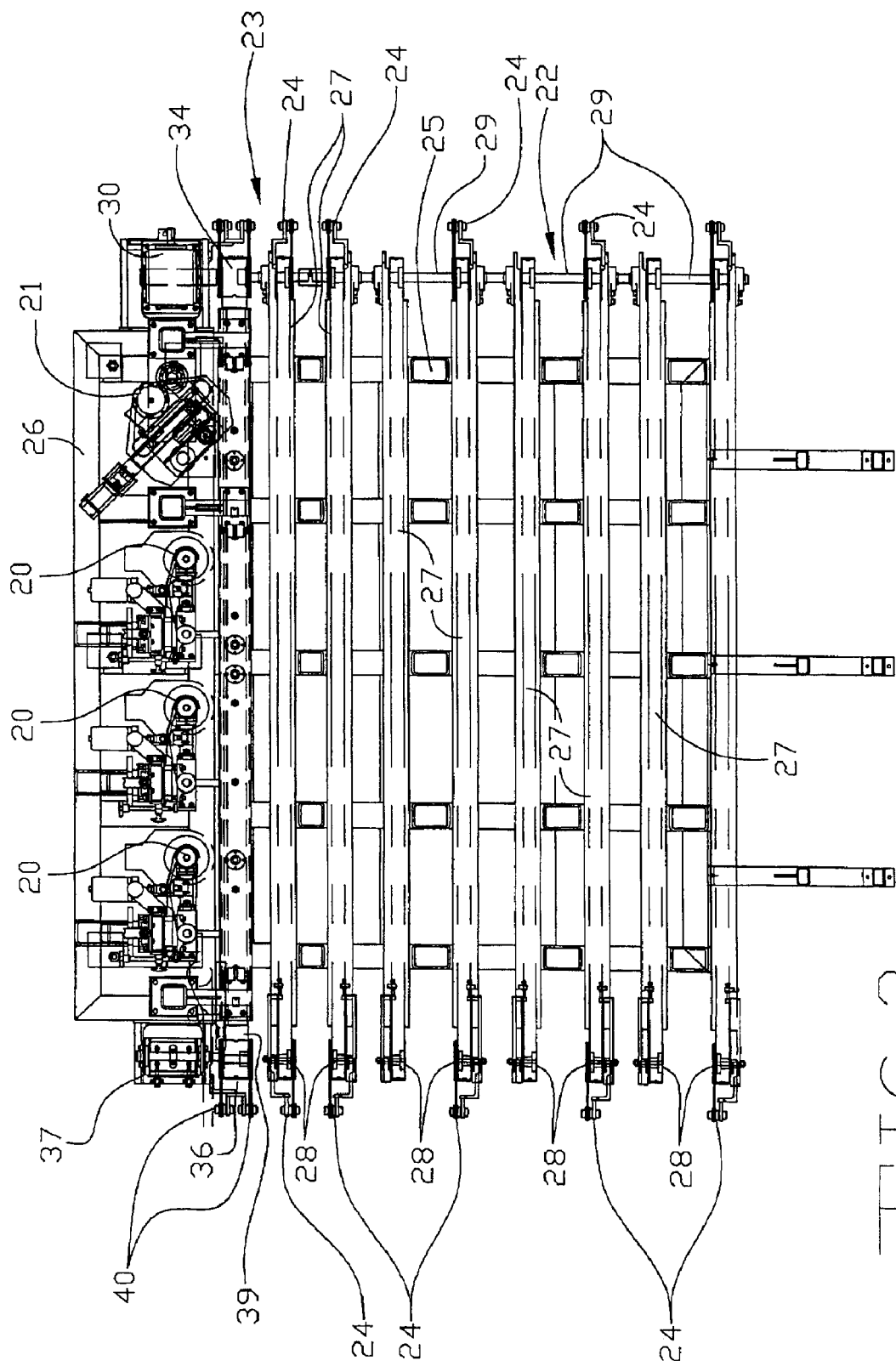
FIG. 2 is a top plan view of finishing unit 3 of the apparatus of FIG. 1.

Referring now to FIG. 2, finishing station 2 is shown in detail. The structure of finishing station 2 is identical in structure to finishing stations 1, 3 and 4 with the exception of the number of the dubbing heads 21 included in finishing stations 2, 3 and 4. Each finishing station 2, 3, 4 will have at least one dubbing head 21 intended to finish a specified corner. It should be noted that finishing station 2 and finishing station 3 each include one dubbing head. Finishing station 1 includes no dubbing head. Finishing station 4 includes two dubbing heads.

Figure 3:
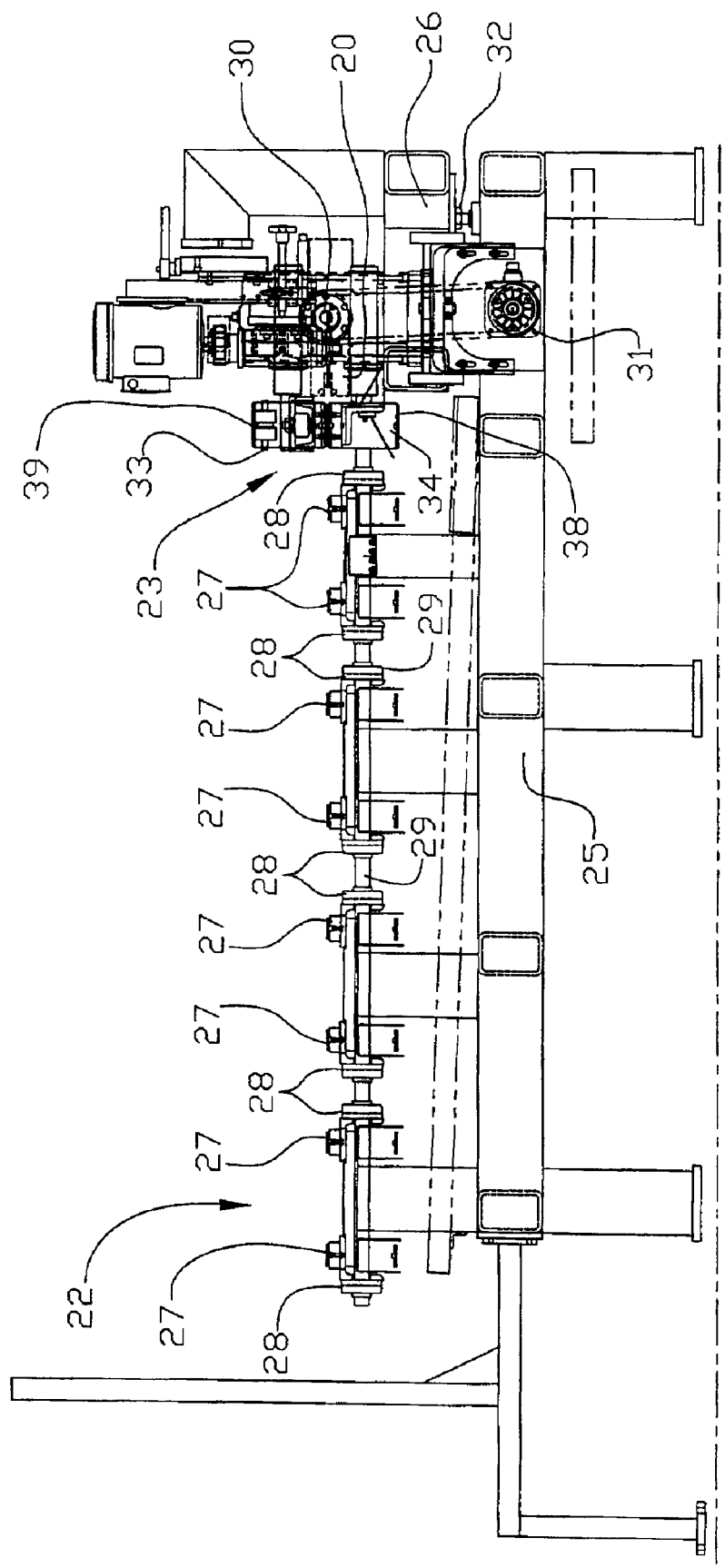
FIG. 3 is an end view of the finishing unit of FIG. 2.

Referring now to FIGS. 2 and 3, each of the four finishing units includes the grinding heads 20 positioned at one side, a conveyer 22 having a hold down system 23 and carryover guides 24. Each finishing unit includes a frame 25, preferably constructed of welded steel, on which the grinding heads 20, dubbing heads 21, conveyers 22, hold down system 23 and carryover guides 24 are mounted.

The main frame 25 supports the conveyer assembly 22 and the spindle frame 26. Positioned on the spindle frame 26 are the grinding heads 20 and dubbing heads 21, if required. The hold down conveyer system 23 is also preferably engaged and supported by the spindle frame 26.

Referring still FIGS. 2 and 3, the conveyer system 22 includes plurality of spaced tracking belts 27 arranged in parallel relationship. The tracking belts 27 are positioned over pulleys 28, at least one set of which are engaged together by a conveyer shaft 29. One end of the conveyer shaft is engaged with a gear box 30 which in turn is driven by servomotor 31 through drive belt 32. If desired, a plurality of carryover conveyers 24 are positioned at each end of each tracking belt 27. The carryover conveyers 24 are intended to facilitate the transfer of workpieces between finishing units and transfer units.

Figure 4:
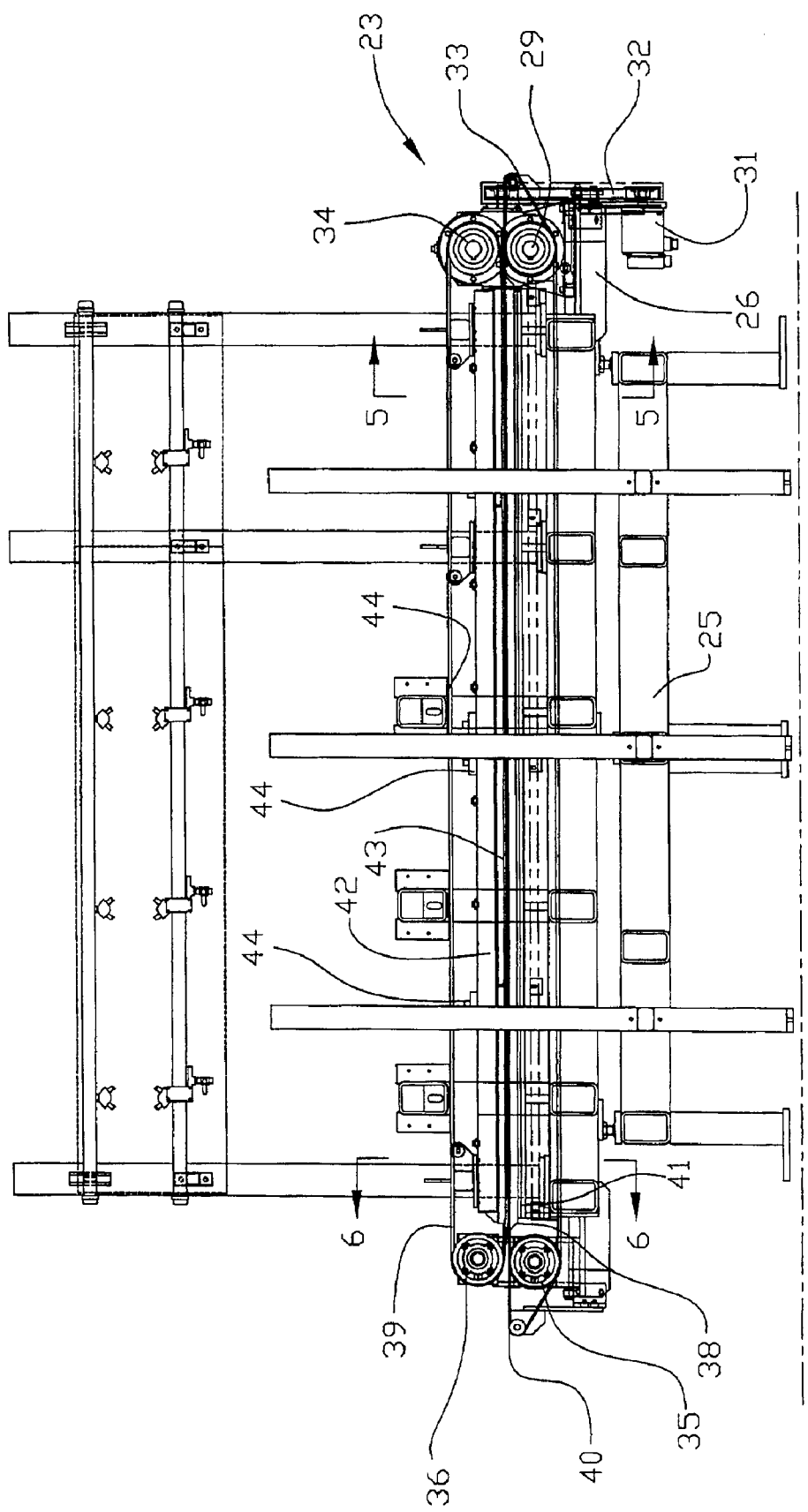
FIG. 4 is a side view of the conveyer and hold down apparatus of a finishing unit.

Also engaged with the conveyer shaft 29, as shown in FIG. 3 and FIG. 4 is the lower drive pulley 33 of the hold down system 23. The upper drive pulley 34 of the hold down system 23 is also engaged with gear box 30 and receives the same drive input as the lower drive pulley 33. Located at the opposed end of each finishing unit are a lower idler pulley 35 and an upper idler pulley 36. The two idler pulleys 35, 36 are engaged with a tensioner block 37 which provided to allow the operator to adjust the tension on the lower hold down belt 38 which is engaged between the lower drive pulley 33 and the lower idler pulley 35. The tensioner block 37 also provides tension on the upper hold down belt 39 which is engaged between the upper drive pulley 34 and the upper idler pulley 36. A carryover pulley 40 is engaged with the lower idler pulley to provide guidance to workpieces entering the finishing unit.

Figure 5:
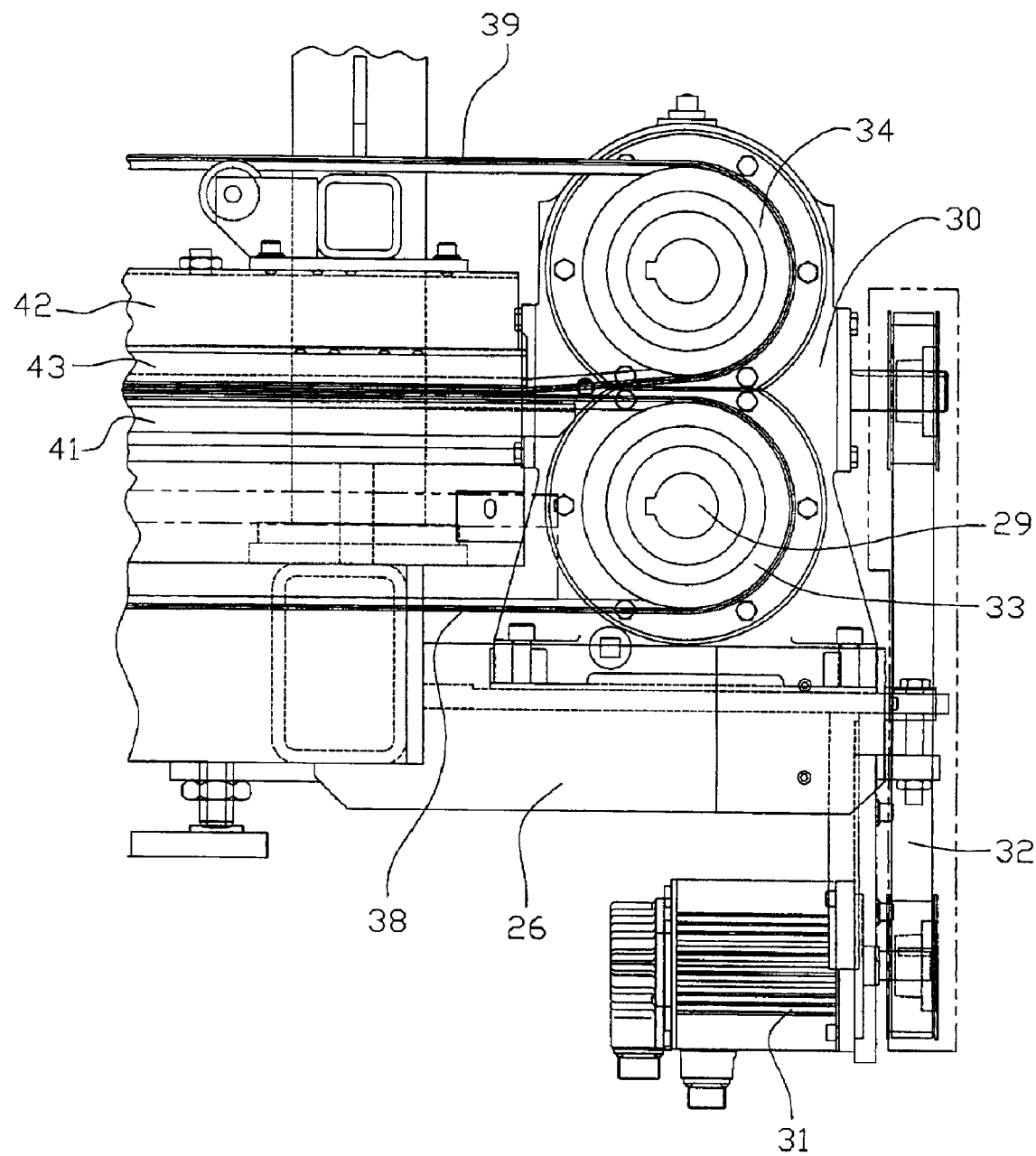
FIG. 5 is a partial view taken along line 5—5 of FIG. 4.
Figure 6:
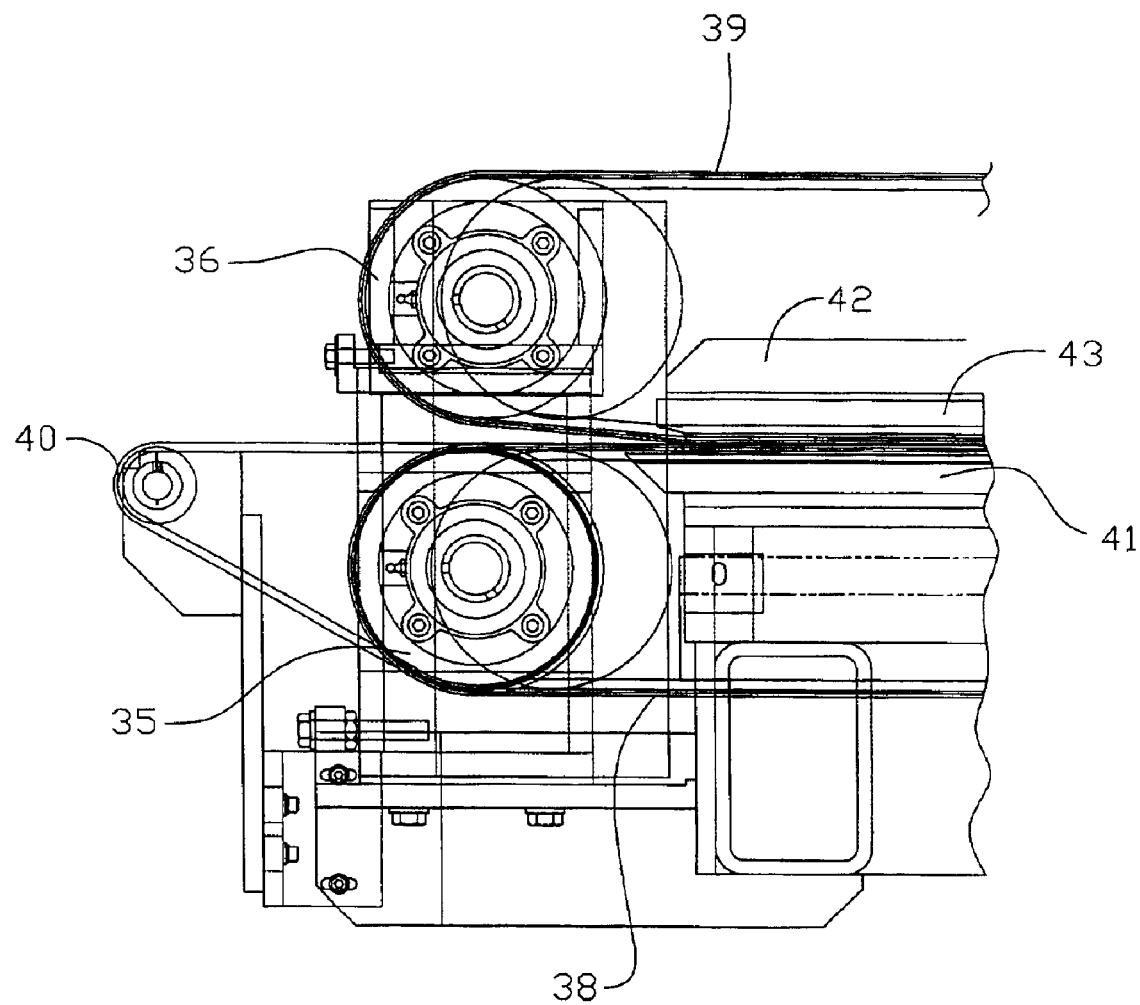
FIG. 6 is a partial view taken along line 6—6 of FIG. 4.
Figure 7:
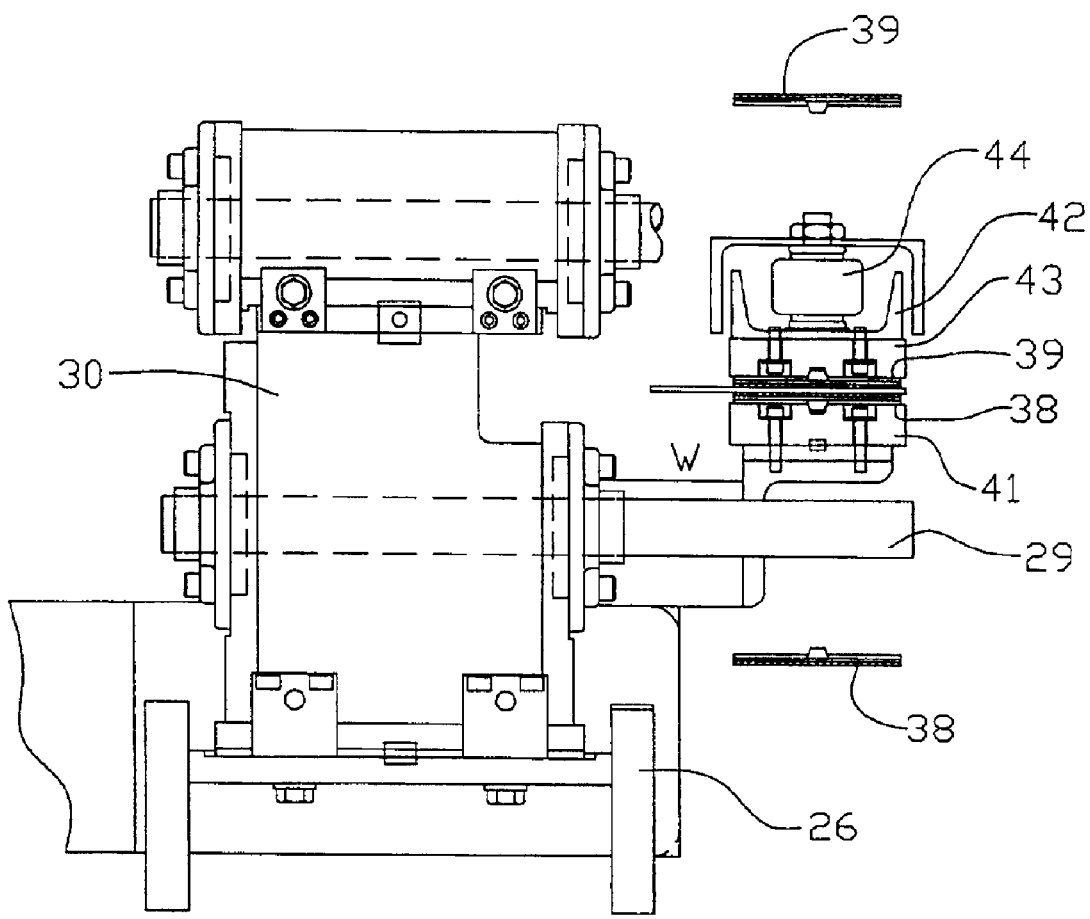
FIG. 7 is a partial detail end view of the hold down apparatus of the invention.

Referring now to FIGS. 4–6, the lower and upper hold down belts 38, 39 are proximately positioned and are designed to retain a workpiece between the two belts as the workpiece is driven at the same speed by the conveyer tracking belts 27 and the hold down belts 38, 39. The hold down belts 38, 39 maintain the workpiece in position as the workpiece is engaged by the grinding heads 20 and dubbing head 21. The lower hold down belt 38 is retained in its position when engaged with a workpiece by lower track 41. The upper hold down belt 39 is retained in position against the workpiece by a platten 42 engaged with an upper track 43. Air cylinders 44 are spaced along the platten 42 to provide a downward force on the platten 42, upper track 43, and upper hold down belt 39 to assist in retaining the workpiece in position for machining by the grinding 20 and dubbing heads 21. The air cylinders 44 and platen 42 allow the upper hold down belt 39 to "float" to accommodate workpieces of varying thickness without need for a tooling changeover.

In operation, the leading edge of a workpiece is referenced and engaged by the carryover conveyors 24 and hold down carryover pulley 40. The upper hold down belt 39 and lower hold down belt 38 grip the edge of the workpiece intended for finishing and the hold down belts 38, 39 and conveyer belts 27 are driven at a pre-determined speed to pass the edge of the workpiece past the grinding head 20 for finishing or edging. A plurality of grinding heads 20 are preferably provided with each finishing unit to allow for multiple changeover of workpieces having various edge thicknesses and for providing different edging styles such as finishing, grinding or pencil edging. Thus, workpieces of various sizes and thicknesses can be machined in a continuous operation without need for stopping the finishing apparatus for tooling changeover and size adjustments.

Figure 8:
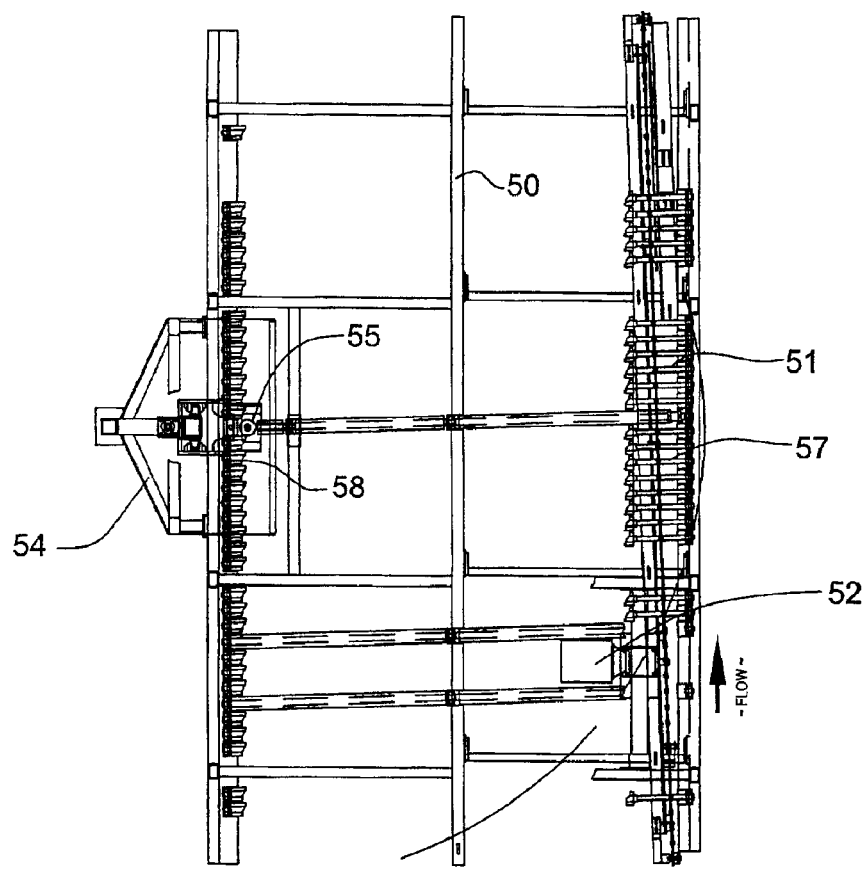
FIG. 8 is a top plan view of the transfer conveyer of the apparatus of FIG. 1 with rollers cutaway.
Figure 9:
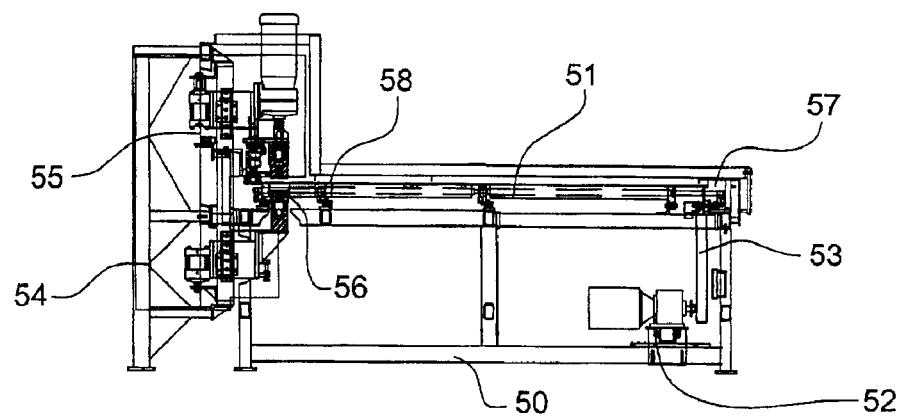
FIG. 9 is an end view of the transfer conveyer of FIG. 8.

Once one edge of the workpiece is seamed, the workpiece is transferred to a 90° transfer station 14, 15, 16. Referring now to FIGS. 8 and 9, the preferred 90° transfer station is constructed of a main frame 50 having a plurality of transversely mounted brush rollers 51. In FIG. 8, the brush rollers 51 are shown as cutaway, however they extend transversely across the full length of the transfer station. The brush rollers 51 are driven by a motor 52 and drive belt 53 in combination. As the workpiece is driven by the rotating brush rollers 51, there is very little frictional interface between the workpiece and the brush rollers 51. In the preferred embodiment, the brush rollers 51 are positioned such that the distal end 57 of each roller 51 is slightly further downstream of the end 58 proximate the rotator frame 54. This angular displacement of the brush rollers 51 will operate in conjunction with a driven edge guide, such as a vertically oriented timing belt, to keep the workpiece in position proximate the rotator frame 54, facilitate rotation of the workpiece and align the new raw edge for the upcoming finishing unit.

The rotator frame 54 is attached to the main frame 50. The rotator frame 54 carries a pneumatic cylinder 55 and pad 56 combination. As the leading edge of the workpiece approaches the pneumatic cylinder 55, the pneumatic cylinder is engaged to clamp the leading corner of the workpiece between the cylinder 55 and pad 56. The brush rollers 51 and driven edge guide continue driving the workpiece and the workpiece rotates 90° about the clamped corner, thereby exposing a new raw edge for machining. After rotation of the workpiece, the cylinder and pad release the workpiece and the brush rollers 51 and edge guide drive the rotated workpiece to the next finishing station in the sequence.

Figure 10:
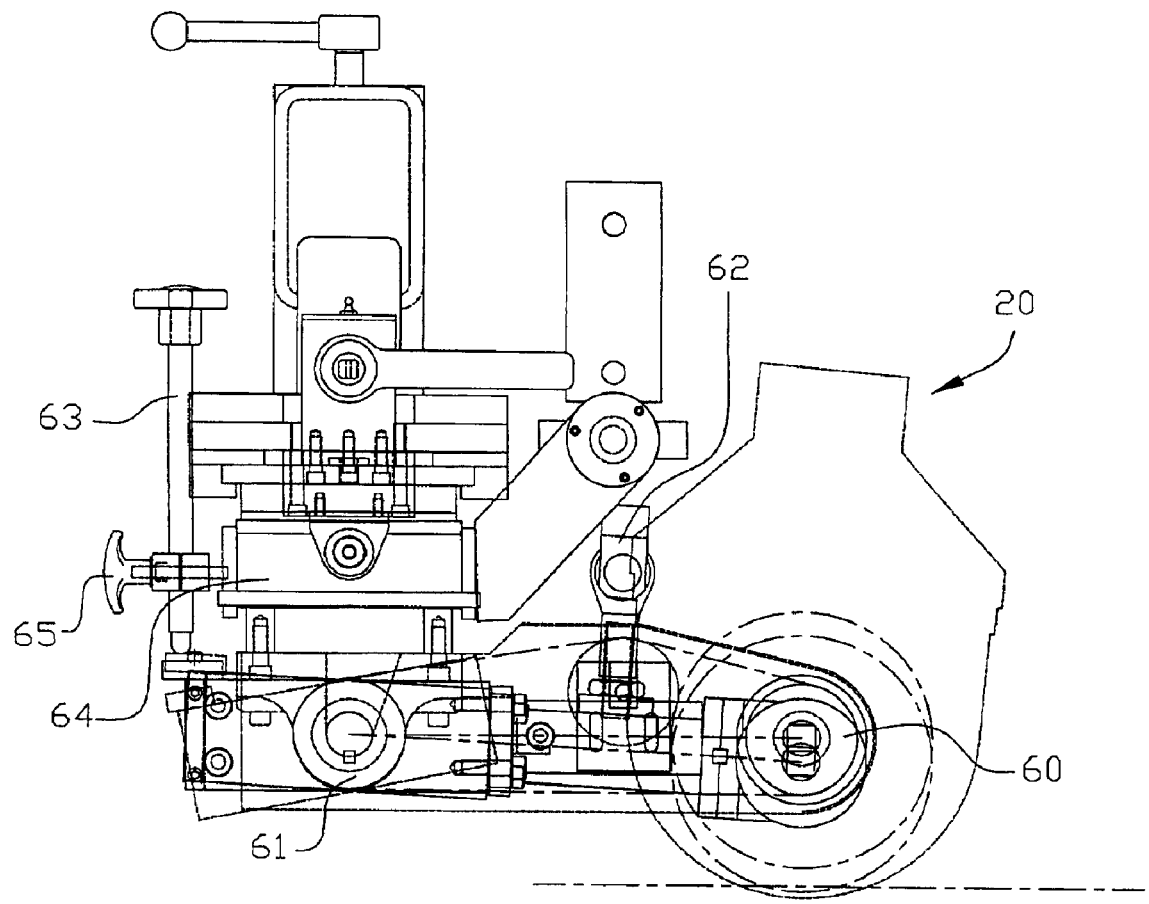
FIG. 10 is a top view of a grinding head of the invention of FIG. 1.
Figure 11:
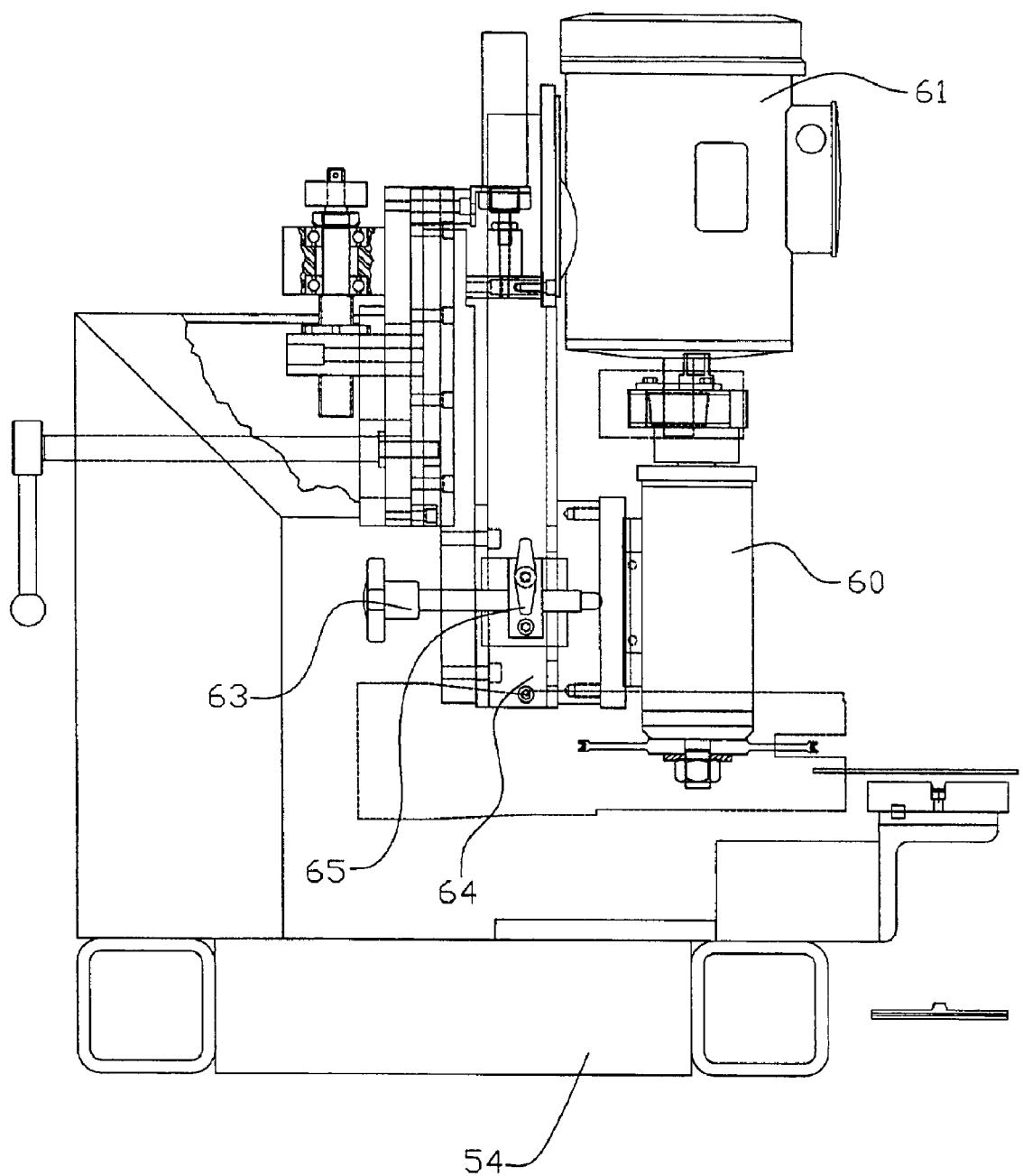
FIG. 11 is a side view of the grinding head of FIG. 10.

The preferable grinder head 20, shown in FIGS. 10 and 11, includes a belt driven spindle 60 powered by a motor 61. The grinding head 20 is, preferably compliant as it engages the workpiece, thereby allowing the grinding head pressure to be varied to allow for the amount of glass to be removed, depending upon the design specifications. The compliance is achieved by means of low pressure air cylinder 62. In an alternative embodiment, however, the grinding head 20 is fixed in position and non-compliant. Large adjustments in the extended position of the grinding wheel are provided by an adjustment knob 63 which allows the operator to change the positioning between the grinder and the workpiece to adjust for the amount of glass being removed and for grinding wheel wear. The pressure cylinder 62 has an electronic feedback which assists the operator in reestablishing the amount of adjustment being made with respect to the workpiece. The spindle 60 and the motor 61 are mounted to the cylinder 62 by means of a slide assembly 64 with tightening screw 65.

A preferred alternate structure of the invention envisions the use of the servomoter 31 for driving the tracking belts 27 and hold down system 23 operating in cooperation with a grinding head 20 which is servo-actuated. The servo-actuated grinding head is CNC controllable along with the CNC servo driven belts 27 and hold-down system 23 to effectively create a 2-axis CNC controlled finishing path at the workpiece.

The grinding head 20 includes a coolant feed system (not shown) to deliver the proper amount of coolant to the wheel. Vacuum coolant collection system is also provided for cleaner operation and for less water carryover down stream.

In it envisioned that additional conveyers may be used with the basic apparatus. A lead-in roll conveyer having a driven edge guide may be used to align the parts properly feeding into the first finishing unit. An additional conveyer can typically be supplied ahead of the roll conveyer to be used as a gapping conveyer and part measuring system to properly space the workpieces of various sizes before they entered the lead-in conveyer. A measuring system calculates the proper gapping between the parts. Other conveyers such as rack turntables and motors may be provided as required.

Other modifications and variations are envisioned within the overall scope of the invention. The above description of the preferred embodiment is intended to be illustrative, but not limiting upon the scope and content of the following claims.

We claim:

1. An apparatus for use in finishing the peripheral edges of a workpiece, wherein the workpiece has a plurality of edges and a leading corner, comprising in combination:

at least two finishing stations, including a first finishing station and at least one following finishing station, each finishing station including at least one finishing device, a conveyer for transporting the workpiece past the finishing device and a hold down device for maintaining the workpiece edge oriented to and in contact with the finishing device; and at least one 90° transfer station positioned between first finishing station and the at least one following station for receiving the workpiece from the first finishing station and reorienting the workpiece 90° to expose a new edge for finishing, the transfer station including a transfer system of driven rollers and a clamping member for grasping and clamping the leading corner of the workpiece, wherein the conveyer system continues to move the workpiece and the workpiece reorients 90° about the clamped corner and wherein the reoriented workpiece is delivered to at least one following finishing station.

2. The apparatus of claim 1 wherein there are a total of four finishing stations separated by a total of three transfer stations.

3. The apparatus of claim 1 wherein each of the at least two finishing stations includes at least three distinct grinding heads capable of performing a different finishing operation.

4. The apparatus of claim 3 wherein the grinding heads are CNC servo actuated and the conveyor and hold down are CNC servo actuated to create a 2-axis finishing path at the workpiece.

5. The apparatus of claim 3 wherein the at least three grinding heads perform grinding and finishing operations on the workpiece.

6. The apparatus of claim 3 wherein the at least three grinding heads are of differing sizes to accommodate a variety of workpiece thicknesses.

7. The apparatus of claim 1 wherein one or more of the finishing stations includes at least one dubbing head.

8. The apparatus of claim 1 further including a carryover guide to align the workpiece with respect to the finishing head.

9. The apparatus of claim 1 wherein the transfer system includes a plurality of driven brush rollers spaced to provide a smooth surface upon which to rotate and transfer the workpiece.

10. The apparatus of claim 9 wherein the brush rollers are angularly disposed to assist in aligning the workpiece for entry into the upcoming finishing station.

11. The apparatus of claim 10 wherein the transfer system further includes a driven edge guide which is speed controlled to cooperate with the driven brush rollers to rotate and align the workpiece for the upcoming finishing station.

12. The apparatus of claim 1 wherein the hold down device is automatically adjustable to accommodate workpieces of varying sizes and thicknesses.

* * * * *